United States Patent
Stene-Johansen et al.

(10) Patent No.: US 7,762,564 B2
(45) Date of Patent: Jul. 27, 2010

(54) SKI SLEDGE

(75) Inventors: Egil Anton Stene-Johansen, Oslo (NO); Ståle Norman Møller, Oslo (NO); Grunde Wåge, Stavanger (NO)

(73) Assignee: North Legion AS (NO)

( * ) Notice: Subject to any disclaimer, the term of this patent is extended or adjusted under 35 U.S.C. 154(b) by 763 days.

(21) Appl. No.: 11/570,289

(22) PCT Filed: May 31, 2005

(86) PCT No.: PCT/NO2005/000178

§ 371 (c)(1), (2), (4) Date: Dec. 15, 2006

(87) PCT Pub. No.: WO2005/120928

PCT Pub. Date: Dec. 22, 2005

(65) Prior Publication Data

US 2007/0257452 A1    Nov. 8, 2007

(30) Foreign Application Priority Data

Jun. 11, 2004    (NO) ................................. 20042453

(51) Int. Cl.
B62B 13/12    (2006.01)
(52) U.S. Cl. ........................ 280/16; 280/15; 280/21.1; 280/22.1
(58) Field of Classification Search .................. 280/15, 280/16, 17, 21.1, 28.14, 28.15, 28.16
See application file for complete search history.

(56) References Cited

U.S. PATENT DOCUMENTS

| | | | | | |
|---|---|---|---|---|---|
| 3,583,507 | A | * | 6/1971 | Trautwein | 180/190 |
| 3,656,775 | A | * | 4/1972 | Krautter | 280/16 |
| 3,682,495 | A | * | 8/1972 | Zaimi | 180/190 |
| 3,799,565 | A | * | 3/1974 | Burtis et al. | 280/16 |
| 3,841,649 | A | * | 10/1974 | McMullen | 280/16 |
| 4,063,746 | A | | 12/1977 | Hansen | |
| 4,334,691 | A | * | 6/1982 | Scheib | 280/14.1 |
| 4,775,161 | A | * | 10/1988 | Bridges | 280/16 |
| 4,796,902 | A | * | 1/1989 | Capra | 280/16 |
| 5,000,466 | A | * | 3/1991 | Den Hartog | 280/21.1 |
| 5,242,176 | A | | 9/1993 | Hendrickson | |
| 5,335,925 | A | | 8/1994 | Dolson | |
| 5,344,167 | A | * | 9/1994 | Strouth | 280/14.1 |
| 6,068,269 | A | | 5/2000 | Bergeron | |
| 6,241,265 | B1 | * | 6/2001 | Kovar et al. | 280/16 |
| 6,279,925 | B1 | * | 8/2001 | Miller | 280/22.1 |
| 6,474,662 | B1 | | 11/2002 | Cormican | |
| 6,530,582 | B2 | * | 3/2003 | Dempster | 280/22.1 |
| 2006/0091623 | A1 | * | 5/2006 | Belt | 280/15 |
| 2007/0257452 | A1 | * | 11/2007 | Stene-Johansen et al. | 280/16 |

(Continued)

FOREIGN PATENT DOCUMENTS

CH    644557    8/1984

(Continued)

*Primary Examiner*—Jeffrey J Restifo
(74) *Attorney, Agent, or Firm*—Brooks Kushman P.C.

(57) ABSTRACT

A description is given of a ski sledge having a swiveling front ski (1) with steering means (6), two essentially mutually parallel rear skis (2, 3) and a seat (4) connected via one or more rods (7) to the steering means, where the rear skis (2, 3) are connected to the sledge by means of a parallelogram arrangement.

20 Claims, 4 Drawing Sheets

U.S. PATENT DOCUMENTS

2008/0029324 A1* 2/2008 Plankenhorn ............... 180/190
2009/0102146 A1* 4/2009 Belt ........................... 280/15

FOREIGN PATENT DOCUMENTS

| | | |
|---|---|---|
| DE | 2409309 | 9/1975 |
| DE | 2424748 | 8/1976 |
| DE | 2525790 | 12/1976 |
| DE | 2533117 | 2/1977 |
| DE | 19602447 | 7/1997 |
| DE | 19845634 | 4/2000 |
| EP | 0117901 | 9/1984 |

* cited by examiner

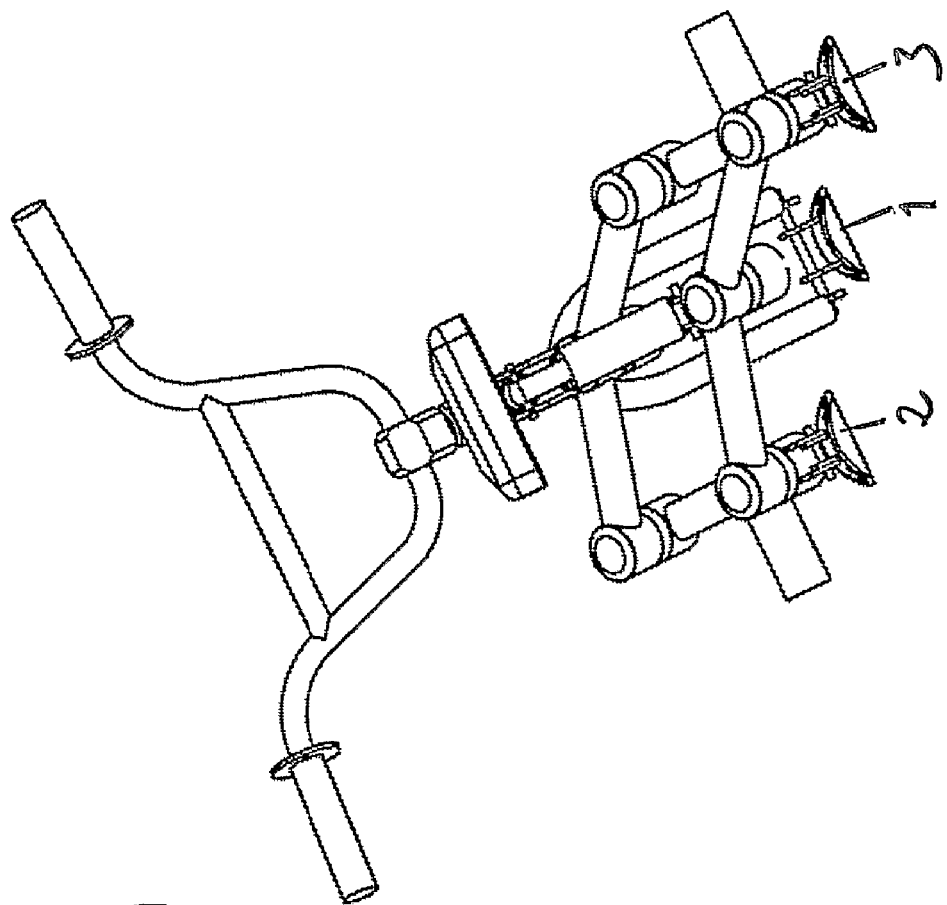
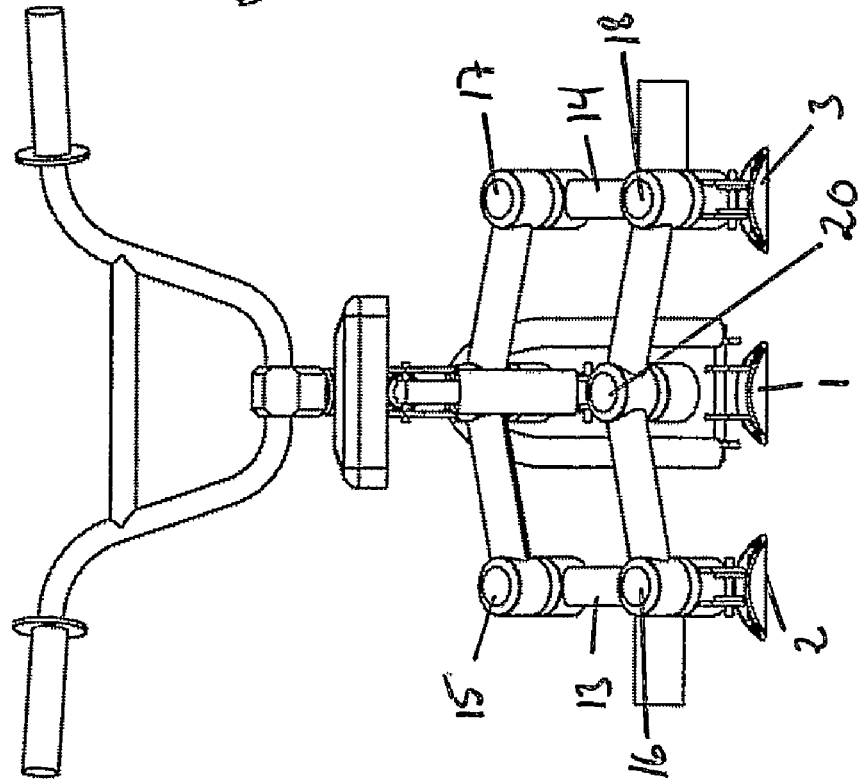
FIG. 3a
Fig. 3b

SKI SLEDGE

CROSS-REFERENCE TO RELATED APPLICATIONS

This application is the U.S. National Phase of PCT Appln. No. PCT/NO2005/000178 filed May 31, 2005 which claims priority to Norway application NO 2004 2453 filed Jun. 11, 2004.

BACKGROUND OF THE INVENTION

1. Field of the Invention

A ski sledge comprising a swiveling front ski with steering means, two essentially mutually parallel rear skis connected to the sledge with a parallelogram arrangement, and a seat connected via one or more rods to the steering means according to the preamble of claim 1.

2. Description of the Related Art

Turning systems for such ski sledges are known from prior art, having a front ski and to rear skis, where the front ski can be swiveled.

In addition, prior art includes sledges with two longitudinal runners, where the runners can be turned synchronously by means of a steering wheel.

From Norwegian patent 135699 there is known a steerable sledge of the above type, which sledge includes a seating portion that, at a rear part of the sledge, is connected to a pair of main runners via support stays supported rotatably about transverse axes in the seating portion and main runners, respectively, together with a central steering runner rotatably supported in the front part of the seating portion, characterized in that the seating portion, in a front part of the sledge, is rotatably supported about a longitudinal central axis, in a raised transverse joint front portion rigidly mounted to the two main runners.

From U.S. Pat. No. 6,068,269 there is known a sledge consisting of two or three runners or skis, where the runners or skis may be pressed against the underlying surface independently of each other, thereby achieving a turning effect.

From U.S. Pat. No. 6,279,925 there is known a sledge comprising two runners or skis, including a control mechanisms that allows the skies to be moved at different levels.

From U.S. Pat. No. 4,796,902 there is known a sledge having a total of four runners or skis, which includes a mechanism that allows two of the skis to be moved with respect to each other at the same time.

From U.S. Pat. No. 6,474,662 there is known a steering mechanism for a snow scooter, in which each of the front steering skis is connected to the actual snow scooter by means of steering tie rods.

From DE-A1 2525790 there is known a ski sledge, where the two rear skies are fastened to the sledge itself by means of a parallelogram construction. According to this publication, use is made of an upright parallelogram which is fastened to lateral rotatably attachments.

From DE-A1 there is known a.o. two embodiments of a parallelogram construction for use with a sledge. The parallelogram according to this publication has similarities with the parallelogram according to present invention, since it is centrally mounted. However, according to this publication, use is made of a standing parallelogram and not a parallelogram angled in a forward direction in connection with a damper device and rotatable joints.

From U.S. Pat. No. 5,242,176 there is known a salvage sledge (ski sledge) adapted for towing behind snow vehicle, which uses a parallelogram to achieve a dampening effect. Each of the rear skies are independently attached to the sledge chassis by use of a separate parallelogram for each ski. The parallelogram construction according to this publication is situated in a plane which seems to be approximately parallel to the longitudinal axis of the sledge (and the direction of movement). This implies that the parallelograms do not allow any significant angling of the skies in relation to the main chassis of the sledge.

DE-A1 2533117 describes a sledge/snowracer with a parallelogram device connecting the two rear skies with the chassis of the sledge (cf. FIGS. 8 and 9). This parallelogram device only comprises one parallelogram.

U.S. Pat. No. 6,474,662 describes a damper device for a snow scooter based on a parallelogram. This parallelogram is connected to the chassis of the vehicle to achieve dampening effect. The parallelogram is not centrally mounted nor positioned obliquely with a damper.

SE-C2 also describes a damper/turning-concept for a snow scooter, which make use of dampers and a parallelogram connected to each ski.

From DE-A1 there is know a ski sledge comprising to substantially parallel skies, each of which is connected to the seat of the sledge by means of two parallelograms, mounted at the front and the rear, respectively. This solution does not make use of a centrally mounted, forward angled parallelogram device in combination with a damper device.

Various other means of steering sledges are known, inter alia, from the following publications:
EP 0 117 901
EP 0 005 485
DE 196 02447 C2
DE off. schrift 24 09 309
DE off. schrift 198 45 634 A1
DE off. Schrift 39 35 938 A1
U.S. Pat. No. 5,335,925
U.S. Pat. No. 6,530,582, and
U.S. Pat. No. 4,334,691

A disadvantage of these prior art solutions is that they only give limited control when turning at high speeds. The problem is that these known solutions do not allow sufficient weight transfer to enable one to resist the centrifugal forces and the force of gravity affecting the sledge and the driver when turning at high speeds. Furthermore, none of the known solutions are adapted for driving while standing up.

There is also known a number of so-called snowbikes/skibikes, which have two skis arranged after each other and which, as a consequence, will not provide the required balance for long jumps and great heights in the halfpipe/quarterpipe.

SUMMARY OF THE INVENTION

The object of the present invention is to provide a sledge of the type mentioned by way of introduction, which has better turning capabilities than any of the previously known solutions, and which can also be used for performing tricks associated with bmx and motocross. The most important aspect introduced by the new turning concept of the sledge according to the invention, is the possibility of achieving optimal control of the turning operation, both when the driver is seated and standing up. This becomes possible through the turning concept being based primarily on weight transfer and through the provision of foot rests that allow tilting, also when standing. When making a turn at high speed, the weight of the driver will trigger the turn, making it unnecessary to turn the handlebars. The new turning concept further provides a unique braking function. This is made possible by the driver leaning inwards at approximately 45° and skidding in the same manner as with skis. Thus the new concept will make it easier to adjust the speed and steer clear of objects than has been the case with previously known sledge crafts. Thus the sledge will be highly suited for use in lift installations, particularly in so-called "terrain parks", e.g. driving in a so-called half-pipe, jumps and rails. Furthermore, the new turning concept provides optimal performance in loosely packed snow. As a result of the angle which the rear skis assume with respect to each other during tilting, the sledge has exceedingly good turning capabilities, also off-piste.

This is achieved with a sledge of the type described in the preamble of the independent claim, with the characteristics given in the characterising part of the independent claim. Additional preferred embodiments and details are given in the dependent claims.

BRIEF DESCRIPTION OF THE DRAWINGS

In the following, an embodiment of the sledge according to the invention will be explained in greater detail with reference to the accompanying drawings, in which:

FIGS. 3a) and b) are rear views of the sledge of FIGS. 1 and 2 with the rear skis in two different positions.

DETAILED DESCRIPTION OF THE PREFERRED EMBODIMENTS

Figure 1:
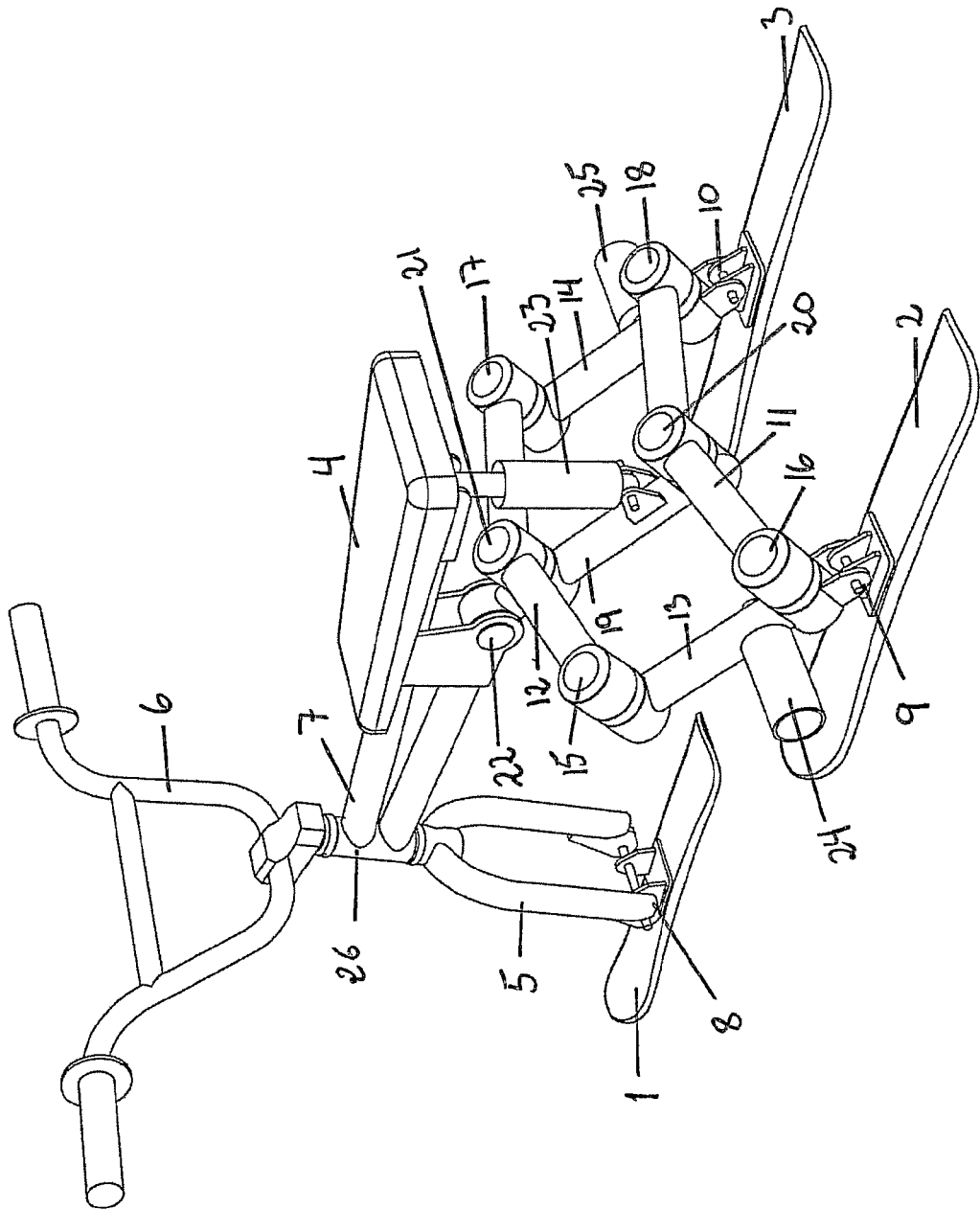
FIG. 1 is a perspective side view of the sledge according to the invention.
Figure 2:
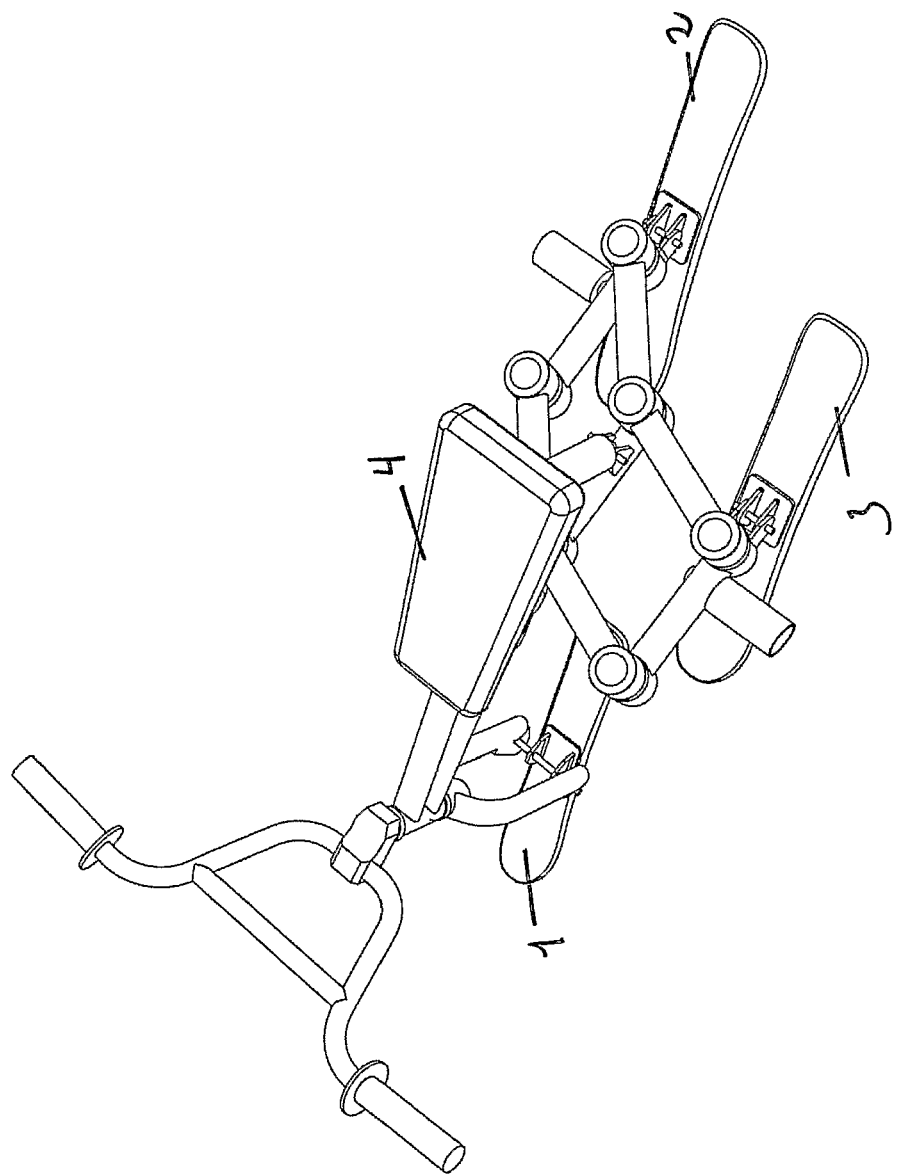
FIG. 2 is a top perspective of the sledge of FIG. 1 in a turning position.

FIG. 1 shows a sledge according to the invention, including a steerable front ski 1, two rear skis 2, 3 and a seating portion (seat) 4. The front ski 1 is connected to a set of handlebars 6 via a fork or a stay 5 and a steering rod 26, in a similar manner to an ordinary bicycle. The fork or stay 5 may optionally be provided with a damper device. The steering rod 26 is further rotatably connected to the seat 4 by one or more stays 7. The ski 1 is rotatably connected to the fork or stay 5 by an articulated joint 8, to allow the ski to move around a substantially horizontal axis. In accordance with a preferred embodiment the joint 8 is equipped with a spring device that will normally maintain the ski 1 at a near horizontal position when not subjected to a force. Optionally, the fork or stay 5 may also be rotatably connected to the stay or stays 7 by means of a spring mechanism, allowing the ski 1 to assume a position of rest in a forward direction when no force is applied to the handlebars 6.

Each of the rear skis 2, 3 is connected to a parallelogram arrangement via joints 9, 10. The parallelogram arrangement includes a lower stay 11 and an upper stay 12, the respective ends of the stays 11, 12 being interconnected by two outer stays 13, 14. The outer stays 13, 14 are rotatably connected to the lower and upper stays 11, 12 by means of joints 15, 16, 17, 18. The lower and upper stays 11, 12 are further rotatably connected to each other with a central stay 19 with joints 20, 21. The joints 20, 21 are placed essentially centrally of the length of the lower and upper stays 11, 12. Together, the stays 11, 12, 13, 14, 19 will form a parallelogram. The stays 13, 14 and 19 will be approximately mutually parallel and the stays 11, 12 will also be approximately mutually parallel, see FIGS. 4a-c.

The central stay 19 is movably connected to the rest of the sledge by the upper end of the stay 19 being attached to the stay or stays 7 by means of an articulated joint, and that portion of the stay 19 which is between joints 20 and 21 is rotatably connected to the rear end of the stay or stays 7 and/or the seat 4 by a stay 23. Optionally, this stay 23 can take the form of a shock absorber or a spring device which prevents impacts from the underlying surface from propagating to the seat 4. The stay 23 is rotatably connected with stay 19 and stay 7 and/or seat 4, respectively.

Each of the outer stays 13, 14 may be provided with projections 24, 25 that act as foot rests. One or more of the joints 15-18 and/or joints 20, 21 may be provided with a spring mechanism to make the rear skis assume a position such as that shown in FIGS. 3a) and 4b), when in a position of rest.

Figure 4C:
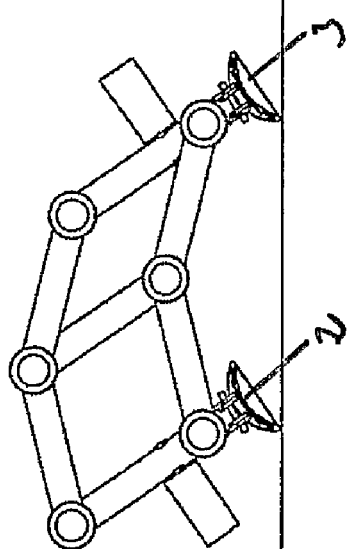
FIGS. 4a-c) show the parallelogram arrangement of the sledge according to the invention in three different positions.
Figure 4B:
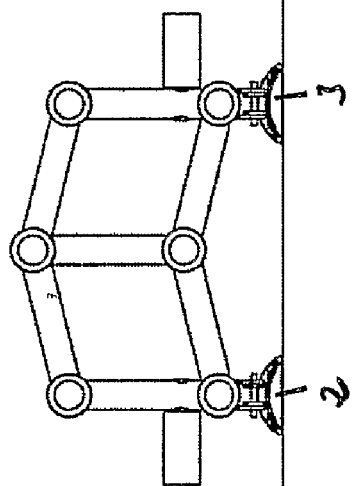
Figure 4A:
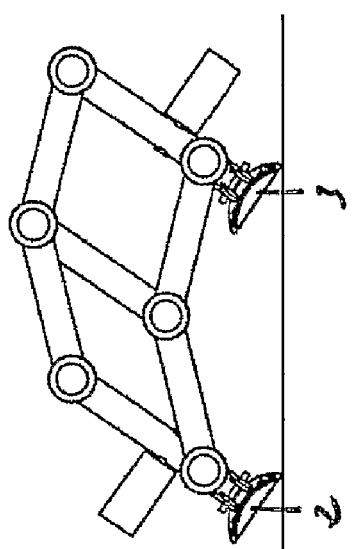

The purpose of the parallelogram arrangement will become apparent from the following description of the sledge, which refers in particular to FIGS. 3a) and b) and 4a)-c). FIGS. 3a) and b) show a rear view of the sledge, while FIGS. 4a)-c) show only the actual parallelogram arrangement. When the sledge is running straight ahead on even ground the skis 1, 2 and 3 will assume a position such as shown in FIGS. 3a) and 4b). The skis 1, 2, 3 will be approximately parallel with the ground. When the sledge turns to the left through the driver turning the handlebars to the left, as shown in FIGS. 3b) and 4a), the driver will "heel" to the left and the parallelogram arrangement will rotate so that the left ski 2 lifts up and the right ski 3 is lowered relative to the seat 4. The entire sledge will thereby heel to the left and the skis will edge into/against the ground and give a better grip. When the sledge turns to the right, as shown in FIG. 4c), the right ski 3 will lift up and the left ski 2 dip down relative to the seat 4, causing the sledge to heel to the right. The skis edging against the ground will result in a better grip, allowing the sledge to maintain a high speed and a small turning radius. The driver's action of leaning from side to side will in all likelihood be sufficient when making turns at high speeds, thus giving the driver a more satisfactory driving experience.

According to one variation of the above described embodiment it is conceivable, within the scope of the present invention, for the approximately vertical stays 13, 14 to be provided with a form of damper, and for the approximately horizontal stay 12 to be rigidly mounted to the approximately vertical stay 19, thereby achieving a similar effect to that of the above described embodiment.

The invention claimed is:

1. A ski sledge comprising:
a frame; a swiveling front ski mounted to the frame and having steering input, two essentially mutually parallel rear skis connected to the sledge frame with a parallelogram arrangement; and a seat connected along a longitudinal axis to the frame, wherein the parallelogram arrangement is connected to the sledge frame approximately centrally of the length thereof, that the parallelogram arrangement is diagonal to a transverse plane that is at approximately right angles to the direction of motion, and that the parallelogram arrangement is combined with a damper device, which parallelogram arrangement includes a lower stay, an upper stay, two outer stays and a central stay pivotably connected to the frame, the lower part of each of the outer stays being connected to each of the skis and the upper part of each of the outer stays being connected to the upper stay, and the lower part of each of the outer stays being connected to the lower stay, that the approximately central part of the lower stay is connected to the lower part of the central stay and the approximately central part of the upper stay is connected to the upper part of the central stay, and that the approximately central part of the central stay is rotatably connected to the seat about a transverse axis perpendicular to the longitudinal axis by a substantially vertical stay.

2. A ski sledge in accordance with claim 1, wherein the outer stays and the central stay are rotatably connected to the lower stay by means of rotatable joints.

3. A ski sledge in accordance with claim 2, wherein the stay is rotatably connected to the central stay, and that the substantially vertical stay is provided with a damper device.

4. A ski sledge in accordance with claim 2, wherein the outer stays are rotatably connected to the upper stay by means of rotatable joints, and that the upper stay is rotatably connected to the central stay by means of a joint.

5. A ski sledge in accordance with claim 2, wherein the stays include a damper device.

6. A ski sledge in accordance with claim 2, wherein the skis are rotatable about an axis that is at approximately right angles to the direction of motion and are fixed against rotation about an axis that is approximately parallel with the direction of motion.

7. A ski sledge in accordance with claim 1, wherein the substantially vertical stay is rotatably connected to the central stay, the plane of rotation being along the longitudinal axis, and that the substantially vertical stay is provided with a damper device.

8. A ski sledge in accordance with claim 7, wherein the outer stays are rotatably connected to the upper stay by means of rotatable joints, and that the upper stay is rotatably connected to the central stay by means of a joint.

9. A ski sledge in accordance with claim 7, wherein the skis are rotatable about an axis that is at approximately right angles to the direction of motion and are fixed against rotation about an axis that is approximately parallel with the direction of motion.

10. A ski sledge in accordance with claim 1, wherein the outer stays are rotatably connected to the upper stay by means of rotatable joints, and that the upper stay is rotatably connected to the central stay by means of a joint.

11. A ski sledge in accordance with claim 10, wherein the stays include a damper device.

12. A ski sledge in accordance with claim 10, wherein the skis are rotatable about an axis that is at approximately right angles to the direction of motion and are fixed against rotation about an axis that is approximately parallel with the direction of motion.

13. A ski sledge in accordance with claim 1, wherein the stays include a damper device.

14. A ski sledge in accordance with claim 1, wherein the skis are rotatable about an axis that is at approximately right angles to the direction of motion and are fixed against rotation about an axis that is approximately parallel with the direction of motion.

15. A ski sledge comprising:
a pair of spaced apart rear skis having a first end, a second end, and an attachment point therebetween;
a steerable front ski assembly, having a first substantially horizontal stay and a second substantially horizontal stay vertically spaced apart from the first substantially horizontal stay, each substantially horizontal stay having a first end, a second end, and a longitudinal axis;
a seat assembly having a seat, the seat including a forward end portion, a rearward portion, an attachment point therebetween, a connector, and a longitudinal axis, the first substantially horizontal stay being connected to the seat at the attachment point of the seat, the connector connected at one end to the forward end portion;
a base comprising a pair of upper stays, a pair of lower stays, a pair of spaced apart outer stays, each having a first and second end, the base further comprising a central stay having a first end, a second end, and two attachment points therebetween, the pair of upper stays being pivotably connected at one end and pivotably connected to the first end of the central stay, the other end of the first upper stay being pivotably connected to the first end of the outer stay, the other end of the second upper stay being pivotably connected to the first end of the second outer stay, the second end of the first outer stay being pivotably connected to the first end of the first lower stay and the first rear ski at the attachment point of the first rear ski, the second end of the second outer stay pivotably connected to the first end of the second lower stay and the second rear ski at the attachment point of the second rear ski, the second end of the first lower stay being pivotably connected to the second end of the second lower stay and the second end of the central stay, a plane of motion of each pivotable connection of the base being transverse to the longitudinal axis of the seat assembly; and
a substantially vertical stay having a first end and a second end, the first end of the substantially vertical stay being pivotably connected to the first substantially horizontal stay and the seat at the attachment point of the seat, the second end of the vertical stay being pivotably connected to the central stay at the first attachment point of the central stay, a plane of motion of each pivotable connection of the substantially vertical stay being along the longitudinal axis and transverse to the plane of motion of the pivotable connections of the base, the seat being pivotably connected to the second end of the second substantially horizontal stay and the second end of the central stay at a connector-second horizontal stay-central stay joint, a plane of motion of the connector-second horizontal stay-central stay joint being along the longitudinal axis wherein the ski sledge is capable of changing directions without changing direction of the steerable front ski assembly when a user transfers weight to urge the ski sledge in a desired direction when the ski sledge is moving forward and the user is sitting or standing on the ski sledge.

16. The ski sledge of claim 15, further comprising:
a first foot rest connected to the first outer stay at an attachment point disposed between the first end of the first outer stay and the second end of the first outer stay, the first foot rest extending away from the center stay; and
a second foot rest connected to the second outer stay at an attachment point disposed between the first end of the second outer stay and the second end of the second outer stay, the second foot rest extending away from the center stay, wherein the ski sledge is capable of turns without changing direction of the steerable front ski assembly when a user transfers weight when standing on the first and second foot rests to urge the ski sledge in the desired direction.

17. The ski sledge of claim 15, wherein the stays of the base, when pivotably connected, are connected with joints, wherein one or more joints include a spring.

18. A ski sledge comprising:
a steerable front ski assembly, having a first substantially horizontal stay and a second substantially horizontal stay vertically spaced apart, each substantially horizontal stay having a first end, a second end, and a longitudinal axis;

a seat assembly having a seat, the seat including a forward end portion, a rearward portion, an attachment point therebetween and a longitudinal axis substantially parallel to the longitudinal axis of the substantially horizontal stays, the first substantially horizontal stay being connected to the seat at the attachment point of the seat;

a base comprising a pair of approximately planar four-bar linkage arrangements sharing a central stay fixed link and connected at a first intermediate point disposed between two ends on the central stay, the pair of four-bar linkage arrangements rotating in a plane transverse to the longitudinal axis of the first substantially horizontal stay, the first four bar linkage arrangement being connected to a first rearward ski, the second four bar arrangement being connected to a second rearward ski; and a planar three-bar linkage arrangement including the central stay, the seat, a connector link disposed between the forward end portion of the seat and the forwardmost end of the central stay, and a stay having two ends, the first end of the stay rotatably attached to the central stay at a second intermediate point disposed between the two ends and disposed rearward of the first intermediate point, the second end of the stay rotatably attached to the seat in the rearward portion of the seat, the three-bar linkage being connected to the second substantially horizontal stay and rotating in a plane parallel to the longitudinal axis of the second substantially horizontal stay.

19. The ski sledge of claim 18, wherein the first or second four-bar linkage arrangement or the three-bar linkage arrangement has two or more articulated joints.

20. The ski sledge of claim 18, wherein the three-bar linkage arrangement includes an additional degree of freedom from a spring.

* * * * *